Figure 1:
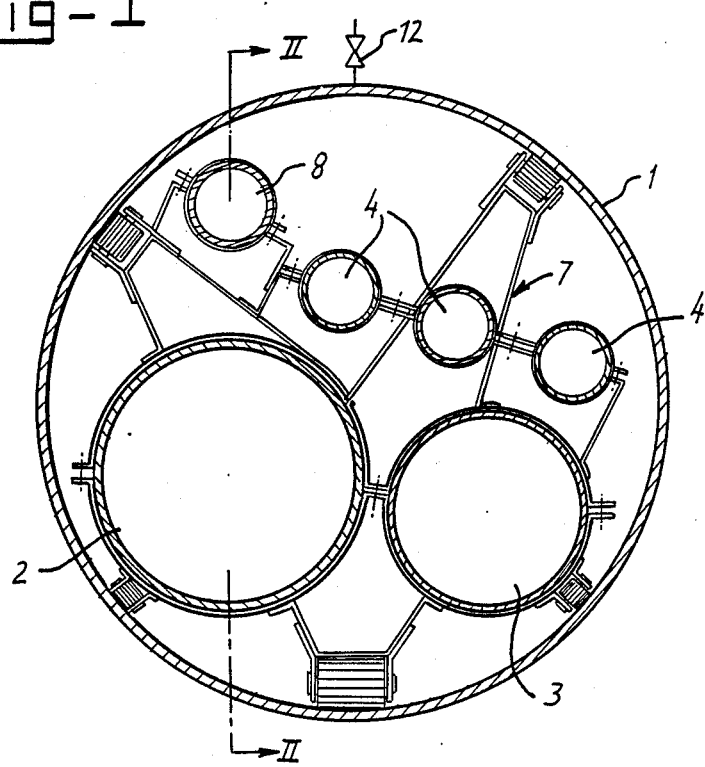

United States Patent [19]

Vergouw

[11] Patent Number: 4,941,773
[45] Date of Patent: Jul. 17, 1990

[54] METHOD FOR THERMAL INSULATION OF PIPELINE BUNDLES UNDER WATER AND PIPELINES INSULATED IN THIS WAY

[75] Inventor: Theodorus C. M. Vergouw, Schoonhoven, Netherlands

[73] Assignee: Smit Offshore Contractors BV, Rotterdam, Netherlands

[21] Appl. No.: 333,467

[22] Filed: Apr. 5, 1989

[30] Foreign Application Priority Data

Apr. 7, 1988 [NL] Netherlands ............... 8800894

[51] Int. Cl.$^5$ .............................................. F16L 1/04
[52] U.S. Cl. ..................................... 405/157; 405/154; 405/168
[58] Field of Search ............... 405/154, 155, 156, 157, 405/158, 168–171; 166/901; 302

[56] References Cited

U.S. PATENT DOCUMENTS

| | | | |
|---|---|---|---|
| 3,563,825 | 2/1971 | Seguya et al. | 405/157 |
| 3,643,005 | 2/1972 | Mathews | 405/157 |
| 3,777,502 | 12/1973 | Michie et al. | 166/901 |
| 3,831,678 | 8/1974 | Mondshine | 166/901 X |
| 3,840,035 | 10/1974 | Lefever | 166/901 X |
| 4,036,285 | 7/1977 | Best | 166/901 X |
| 4,258,791 | 3/1981 | Brandt et al. | 166/901 X |

Primary Examiner—Dennis L. Taylor
Attorney, Agent, or Firm—Webb, Burden, Ziesenheim & Webb

[57] ABSTRACT

For heat insulation of pipeline bundles under water the invention proposes to fill the space between one or more gas or fluid conducting lines and a surrounding carrier pipe with a crude oil fraction, preferably a kerosene fraction, with gelling chemicals, so that the oil is viscosified in the bundle on or near the destined location. The dynamic viscosity after gellation is preferably between 10 and 1.000 Pa.S. The oil is preferably a kerosene fraction. The invention also relates to the way of filling the said space and to means for keeping pressure on the gel by a duct in the carrier pipe, filled with gas and having a pig movable therein and in contact with the gel so that the gas keeps the pig pressed onto the gel.

8 Claims, 1 Drawing Sheet

U.S. Patent

Jul. 17, 1990

4,941,773

METHOD FOR THERMAL INSULATION OF PIPELINE BUNDLES UNDER WATER AND PIPELINES INSULATED IN THIS WAY

The invention relates to a method for applying a thermal insulation material between one or more gas or fluid conducting pipelines and a carrier pipe surrounding these in pipeline bundles for transport of fluid and gaseous minerals subsea and to a pipeline bundle insulated according to this method.

The media transported in such pipelines often have a temperature which is higher than the surrounding water, and a thermal insulation thereof can be required for several reasons, i.e. to maintain a low viscosity in for instance crude oil, to avoid depositions by viscosifying or solidifying of fractions thereof and for instance in gaslines, to avoid condensation of water vapour and other components in the lines.

It is known to obtain such a thermal insulation in several ways, for instance by applying a pipe-in-pipe system with a synthetic foam, a sodium or calcium silicate in the annular space between such pipes and by providing the lines with a solid inner or outer insulation layer, for instance of neoprene rubber, and with insulation layers of glassfibre fabric alternated with metalfoils and a space filled with inert gas and with hollow spheres of plastic material in a synthetic resin matrix.

All these and similar techniques have serious disadvantages in way of investment cost, problems with heating of the lines, and often a decay of the insulating properties of the insulation materials by segregation, chemical or physical change of properties and such factors.

The invention aims at improving this and to this end a method as captioned according to the invention is characterized in that at or near the intended location a crude oil fraction that can be gelled, including gelling chemicals for the purpose of gelling the crude oil fraction to a viscous mass, is pumped with such chemicals into the space to be insulated of the pipeline bundle.

In general, the gelling chemicals and the amounts are chosen in type and amount in such a way, that after gellation, the dynamic viscosity of the gel produced is between 10 an 1000 Pa.s, in which range an initial viscosity of at least 500 Pa.s is preferred. An initial viscosity means a viscosity in the natural surroundings of the bundle without e.g. hot gas or oil flowing through the pipelines. Such gas or oil may heat the gel so that its viscosity is lowered to e.g. 100 Pa.s.

In applying the invention a good thermal insulation is obtained, in a way which is specifically suitable for subsea pipelines that need to adjust to seabed irregularities without causing adverse effects on the insulation and decay of insulating properties by temperature alterations in the media which are transported by the gas or fluid conducting lines.

The crude oil fraction is preferably a kerosene fraction, although other fractions or mixtures thereof may be used, such as diesel oil.

Furthermore, the method according to the invention can be carried out in such a way, that the fabrication and construction of the pipeline bundle can be effected in a relatively simple and cost effective way, also because the carrier pipe is not required to withstand large pressure differences.

The viscous gel can simply have and maintain the same pressure as the seawater outside the bundle.

Additionally, the invention involves special measures to maintain such equal pressures with more certainty, as described hereunder.

It is noted that it is known to use thixotropic oil-base fluids as an insulator for oil wells, where oil or gas of a high temperature is produced and for steam injection wells whereby the viscosity of the oil to be recovered is reduced by application of heat to enhance oil-recovery.

This application for instance is known from a paper by Son, Dzialowsky and Loftin: Gelatinous oil-base fluids as Insulators in Geothermal and Oil-recovery Applications, held at the International Symposium of Oilfield and Geothermal Chemistry of the SPE of AIME, Denver, Co, June 1983, published in the Proceedings thereof as Paper SPE 11791 pp 189-198.

Gelling chemicals for such crude-oil fractions are commercially available, for instance under brandnames as KEN PAK of Imco Services. These chemicals can consist of many compositions, e.g. condensation products of penta—to hepta—alcohols with an aromatic monoaldehyde, like benzaldehyde, benzylidenesorbitols etc. as in itself known. In distinction of the information given in the above mentioned paper many of such chemicals will not give a thixotropic behaviour of the gel, but will give a gel which will show increased viscosity when stirred or in some other way be subjected to shearing forces.

Furthermore, small amounts of chemicals that have additional effects can be added, like chemicals that influence speed of viscosifying (catalyst-like activators), biocides etc., if they are not or not sufficiently available in the commercially available chemicals.

Preferably, between 3 and 8% of such chemicals are added (in total amount), in particular if the oil is a kerosene fraction.

The concentration of gel chemicals is preferably such that the dynamic viscosity reaches a value between 10 and 1000 Pa.s. The invention does of course not relate to details of the composition of gelling chemicals, as these are known and commercially available and as a professional engineer can deduct from relevant data and/or from several simple tests, how much gelling chemicals should be added and whether from one or more of the described additional chemicals more or less should be added.

Figure 2:
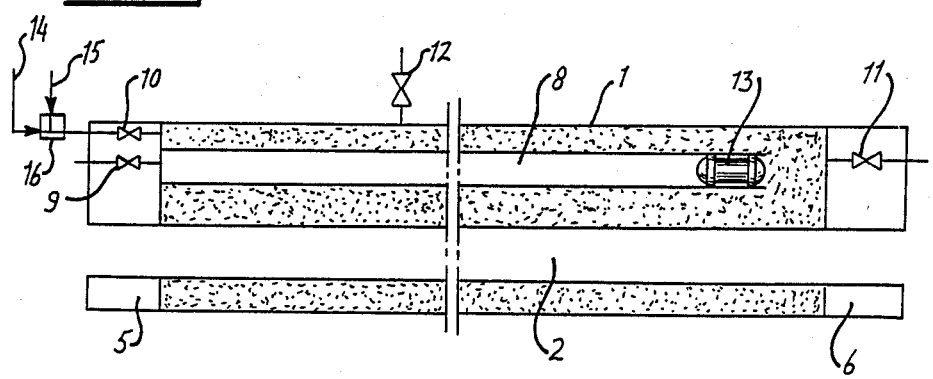

The invention will now be described in more detail with reference to the attached figures. Therein:

FIG. 1 is a somewhat schematic cross section of a subsea pipelines bundle in which an insulation method according to the invention is carried out; and FIG. 2 is a much more schematic interrupted longitudinal section of such a bundle along line II—II in FIG. 1.

The pipeline bundle of FIGS. 1 and 2 comprises a carrier pipe 1 enclosing several lines 2, 3 and 4 where for instance the lines 2 and 3 may serve as conduit for oil or gas in production add the smaller-in this case three-lines 4 may have additional purposes, for instance inclusion of power cables, control and signalling umbilicals, convey tools (TFL) etc. as in itself known in many different designs. Furthermore the number of lines can be varied extensively depending on the oil field parameters. For instance, a water injection line may be enclosed in the carrier pipe.

At both ends of the bundle suitable terminations of the lines are provided so as to connect them to platforms, reservoirs, processing means, wellheads and risers to the surface, e.g. to a ship.

This is also entirely known and therefore in FIG. 2 these are indicated in a simple rectangle 5 and 6 which represent the in itself known towheads.

In FIG. 1, a spacer 7 is indicated for support of the lines 2-4 on and within the carrier pipe 1.

This spacer can be supported in the carrier solidly or totally or partly hinged and/or sliding on slides, skates or rollers. As the bundle usually is several kilometres long, a large number of these spacers is fitted at a certain pitch along the length, to maintain the lines in position, and at the correct distance from each other and from the carrier pipe. These spacers can be designed such that they support only a certain number of the lines at one location and the other lines at another location.

In any case the support is arranged such that it does not hinder the lines in axial displacement, mutual differences therein and local expansion due to temperature differences.

Inside the carrier pipe 1 a line 8 is located which is connected at one side to the endbulkhead at the towhead 5 as shown in FIG. 2 and which is open to the space in the carrier pipe between the lines 2-4 at the other side of the bundle. Here line 8 is drawn as ending before the bulkhead 6 but it could also be connected to the bulkhead and provided with one or more relatively large holes to achieve a connection to said space.

The towheads 5, 6 can incorporate various connections to adjacent structures, pipelines, valves, etc. which have not been drawn in. Furthermore the towhead 5 incorporates a valve 9, which connects to line 8, and at least one valve 10, 11 is located on each end, which connects to the space in the carrier pipe 1 between the lines 2-4.

On top of the carrier, one or more valves 12 are located, arranged in such numbers and locations as to vent off gas from the space therein, the positions of which are chosen so that this is possible even if the bundle is at an angle and is adjusted to an irregular seabed. In line 8, a pig 13 is located near the open end which has a tight fit (e.g. with PTFE-rings at the circumference) but so as to be movable along this line.

The carrier pipe 1 has a diameter of e.g. 100 cm and the line 8 can have a diameter of approx. 10 cm.

The lines 2-4 can have wall thicknesses which depend on possible pressure differences between inside and outside. Also in particular lines, which are to be subjected to high temperatures, can be provided with expansion bellows (not drawn) and/or with a sliding seal at the ends through the bulkhead at the towheads 5 and 6 or one of these to allow and compensate for relative expansion versus the other lines and the carrier pipe. All mentioned valves can have actuators (not drawn) and control lines can run from these to a control room for remote control of these valves e.g. from a ship.

Installation and insulation of this pipeline bundle now is carried out as follows: The bundle is fabricated and assembled, checked and tested, onshore and filled with a gas as inertly as possible e.g. nitrogen.

After sealing the bundle at the ends and launching, the bundle is towed to its destined location, where it is lowered to the seabed e.g. by (partial) flooding of lines 2-4 with the surrounding water.

The gas pressure in the space around the lines 2-4 in the carrier pipe 1 is, either before or at launch or at the destined location and optionally at the water surface or after lowering, increased to a pressure which is approximately equal to (preferably somewhat higher than) the pressure of the surrounding seawater on the bundle after lowering.

Now the crude-oil fraction is pumped from a ship or platform through a line 14, while the gelling chemicals and possible additional chemicals are injected through a line 15.

These chemicals are mixed intensively at 16 and pumped through valve 10 (when opened) into the space around the lines 2-4 that needs to be insulated.

Pumps and mixer 16 can be positioned on the ship or platform, although in FIG. 2 these are drawn near the bundle.

The connection of the gel supply line is preferably carried out after lowering of the bundle.

The valves 11 and 12 can be non-return valves which only open simply when the pressure inside the bundle becomes greater than the environmental pressure, but preferably these are also remotely controlled or closing in response to the local presence of gel, such that no environmental pollution occurs by the gel and no seawater enters the space around the lines 2-4. The invading gel drives out the gas from said space that needs to be insulated, which gas is vented off through the valves 11 and 12.

The gel can contain a dye for easy observation of small amounts that might escape and the valves 11 and 12 may also be closed on the basis of such an observation.

After complete filling of the said space in this way, all mentioned valves 10, 11, 12 are closed and the lines 2-4 can be freed from seawater at any desirable moment.

The gellation starts as soon as the crude oil fraction and the chemicals are mixed at 16, but takes so much time (generally approx. 12 hours) that the mass can be pumped into the said space as a thin fluid because the gellation becomes only noticeable in said space.

The space in line 8 is, e.g. by valve 9, also filled with gas which is at the same pressure as the space to be insulated. If the gel is pumped in at a somewhat higher pressure than the gas pressure or if it expands during gellation, it will push the pig 13 to the left accordingly in FIG. 2, where in case of a closed valve 9 the gas pressure in the line 8 increases up to equilibrium.

During service the gel may expand or contract by temperature variations in lines 2-4 and in this case the gas in line 8 will kepp the pig 13 pressurised onto the gel, so that the gel maintains a pressure that is equal to that of the gas in line 8. If desired, the gas pressure in line 8 can be measured and maintained at the desired pressure through valve 9, e.g. by supplying gas when the pressure has dropped.

As the gel is not solid, it is easily capable of flowing as a thick fluid to keep the space completely filled in the line 8 to the right of the pig 13 also when the pig moves.

I claim:

1. Method for application, in subsea pipeline bundles for transport of fluid or gaseous minerals in between one or more gas or fluid conducting lines and a carrier pipe surrounding them, of a thermal insulation filling characterized in that on or near the destined location a crude oil fraction that can be gelled with gelling chemicals suited for viscosifying the crude oil fraction, is pumped with such chemicals into the space to be insulated of the bundle and a variably pressurized gas is introduced to said gel to maintain said gel at a constant pressure sufficient to prevent collapse of said carrier pipe from the pressure of the surrounding seawater on said bundle after lowering said bundles into a subsea environment as a result of the expansion and contraction of said gel, wherein sufficient gelling chemicals are added such that after gellation, the dynamic viscosity of the gel is between 10 and 1000 Pa.S.

2. Method according to claim 1, in which the dynamic viscosity is made to be initially above 500 Pa.s.

3. Method according to claim 1, in which the crude oil fraction is a kerosene fraction.

4. Method according to claim 1, in which the gelling chemicals are mixed with the oil directly before the location of injection into the said space.

5. Method according to claim 1, in which valves, located on the pipeline bundle which has been pressurised with a gas up to a pressure at least equal to the surrounding waterpressure, are opened in such a way, that the gelled fluid which has not reached final viscosity yet is injected through one of the valves and that the other valve(s) is (are) opened in such a way, that the gas is driven out through these valves without the possibility of water entering the said space.

6. Method according to claim 1, in which an inner line in the carrier pipe is closed or closeable at one side to the outside and to the said space, and is connected to the said space at or near the other end, in which inner line a pressurized gas and a pig are installed, and in which at a location outside the inner line the gel is pumped into the said space, so that the gas pressure remains on the gel continuously through the pig.

7. A subsea Pipeline bundle, insulated through the application of the method according to claim 1 and with an insulating filling consisting of a viscous crude oil fraction based gel in the space between the carrier pipe and one or more gas or fluid conducting lines.

8. The pipeline bundle of claim 7, wherein said gel is maintained at a constant pressure sufficient to prevent collapse of said carrier pipe from the pressure of the surrounding seawater on said bundle after lowering said bundles into a subsea environment, in which said constant pressure is maintained by an inner line in said carrier pipe, closed or closeable at one side to the outside and to the said space, and is connected to said space at or near the other end, in which inner line a pressurized gas and a pig are installed, and in which at a location outside the inner line the gel is pumped into said space, so that the gas pressure remains on said gel continuously through said pig.

* * * * *

UNITED STATES PATENT AND TRADEMARK OFFICE
CERTIFICATE OF CORRECTION

PATENT NO. : 4,941,773

DATED : July 17, 1990

INVENTOR(S) : Theodorus C. M. Vergouw

It is certified that error appears in the above-identified patent and that said Letters Patent is hereby corrected as shown below:

Front page, under References Cited U.S. PATENT DOCUMENTS insert
--3,719,601 3/1973 Jacocks 252/62
3,444,279 5/1969 Dost 264/45--.

Front page, insert
--FOREIGN PATENT DOCUMENTS
0177475 9/1986 Europe
1918575 6/1969 Germany OTHER PUBLICATIONS
Proceedings Of International Symposium Of Oil Field And Geothermal Chemistry, Spe, Aime, 1-3 juni 1983, Denver, blz. 189-198; A.J. Son et al.: "Gelatinous Oil-Base Fluids as Insulators in Geothermal and Oil-Recovery Applications"--.

Abstract Line 8 "1.000" should read --1000--.

Column 1 Line 45 "an" (first occurrence) should read --and--.

Column 2 Line 57 "add" should read --and--.

Column 4 Line 46 "kepp" should read --keep--.

UNITED STATES PATENT AND TRADEMARK OFFICE
CERTIFICATE OF CORRECTION

PATENT NO.  : 4,941,773

DATED       : July 17, 1990

INVENTOR(S) : Theodorus C.M. Vergouw

It is certified that error appears in the above-identified patent and that said Letters Patent is hereby corrected as shown below:

Claim 7 line 5 column 6, "Pipeline" should read --pipeline--.

Signed and Sealed this

Tenth Day of September, 1991

Attest:

HARRY F. MANBECK, JR.

*Attesting Officer*  *Commissioner of Patents and Trademarks*